(12) United States Patent
Lewis et al.

(10) Patent No.: US 10,612,986 B2
(45) Date of Patent: Apr. 7, 2020

(54) PRINTED STRETCHABLE STRAIN SENSOR

(71) Applicant: President and Fellows of Harvard College, Cambridge, MA (US)

(72) Inventors: Jennifer A. Lewis, Cambridge, MA (US); Joseph T. Muth, North Plains, OR (US); Daniel M. Vogt, Cambridge, MA (US); Ryan L. Truby, Boston, MA (US); Yigit Menguc, Somerville, MA (US); David B. Kolesky, Cambridge, MA (US); Robert J. Wood, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 16/157,586

(22) Filed: Oct. 11, 2018

(65) Prior Publication Data
US 2019/0094089 A1   Mar. 28, 2019

Related U.S. Application Data

(63) Continuation of application No. 15/036,937, filed as application No. PCT/US2014/065899 on Nov. 17, 2014, now Pat. No. 10,151,649.
(Continued)

(51) Int. Cl.
*G01L 1/22* (2006.01)
*G01L 1/18* (2006.01)
(Continued)

(52) U.S. Cl.
CPC .............. *G01L 1/2287* (2013.01); *G01L 1/18* (2013.01); *G01L 1/20* (2013.01); *G06F 3/014* (2013.01)

(58) Field of Classification Search
CPC . G01L 1/2287; G01L 1/18; G01L 1/20; G06F 3/014
(Continued)

(56) References Cited

U.S. PATENT DOCUMENTS 7,053,125 B2   5/2006   Lewis et al.
7,141,617 B2   11/2006  Gratson et al.
(Continued)

FOREIGN PATENT DOCUMENTS

WO   WO 2013/044226 A2   3/2013
WO   WO 2013/096664 A1   6/2013
(Continued)

OTHER PUBLICATIONS

International Search Report and Written Opinion for International PCT No. PCT/US2014/65899, dated Feb. 19, 2015, pp. 1-9.
(Continued)

*Primary Examiner* — Octavia Hollington
(74) *Attorney, Agent, or Firm* — Brinks Gilson & Lione

(57) ABSTRACT

A printed stretchable strain sensor comprises a seamless elastomeric body and a strain-sensitive conductive structure embedded in the seamless elastomeric body. The strain-sensitive conductive structure comprises one or more conductive filaments arranged in a continuous pattern. A method of printing a stretchable strain sensor comprises depositing one or more conductive filaments in a predetermined continuous pattern into or onto a support matrix. After the depositing, the support matrix is cured to embed a strain-sensitive conductive structure in a seamless elastomeric body.

15 Claims, 10 Drawing Sheets

Related U.S. Application Data

(60) Provisional application No. 61/905,489, filed on Nov. 18, 2013.

(51) Int. Cl.
  G01L 1/20 (2006.01)
  G06F 3/01 (2006.01)

(58) Field of Classification Search
  USPC .................................................. 73/774, 777
  See application file for complete search history.

(56) References Cited

U.S. PATENT DOCUMENTS

| | | | |
|---|---|---|---|
| 7,162,925 B2* | 1/2007 | Dietrich | G01L 19/14 |
| | | | 73/715 |
| 7,790,061 B2 | 9/2010 | Gratson et al. | |
| 7,799,251 B2 | 9/2010 | Therriault et al. | |
| 7,900,520 B2* | 3/2011 | Colombo | G01L 19/147 |
| | | | 257/419 |
| 7,922,939 B2 | 4/2011 | Lewis et al. | |
| 7,956,102 B2 | 6/2011 | Lewis et al. | |
| 8,101,139 B2 | 1/2012 | Therriault et al. | |
| 8,187,500 B2 | 5/2012 | Lewis et al. | |
| 8,250,927 B2* | 8/2012 | Anand | G01B 7/20 |
| | | | 73/763 |
| 8,316,719 B2 | 11/2012 | Majidi et al. | |
| 8,640,549 B2* | 2/2014 | Inamori | G01B 7/18 |
| | | | 73/766 |
| 9,797,791 B2* | 10/2017 | Vogt | G01L 1/20 |
| 10,375,765 B2* | 8/2019 | Chaffins | B29C 64/165 |
| 2010/0330220 A1 | 12/2010 | Gratson et al. | |
| 2013/0084449 A1 | 4/2013 | Lewis et al. | |
| 2014/0314954 A1 | 10/2014 | Lewis et al. | |

FOREIGN PATENT DOCUMENTS

| | | |
|---|---|---|
| WO | WO 2014/182535 A1 | 11/2014 |
| WO | WO 2014/209994 A2 | 12/2014 |
| WO | WO 2015/069619 A1 | 5/2015 |

OTHER PUBLICATIONS

Ahn, Bok Y. et al., "Omnidirectional Printing of Flexible, Stretchable, and Spanning Silver Microelectrodes," *Science*, 323 (2009) pp. 1590-1593.

Bilotti, Emiliano et al., "Fabrication and property prediction of conductive and strain sensing TPU/CNT nanocomposite fibres," *Journal of Materials Chemistry*, 20 (2010) pp. 9449-9455; DOI: 10.1039/c0jm01827a.

Chun, Kyoung-Yong et al., "Highly conductive, printable and stretchable composite films of carbon nanotubes and silver," *Nature Nanotechnology*, 5 (Dec. 2010) pp. 853-857; DOI:10.1038/NNANO. 2010.232.

Cochrane, Cédric et al., "Design and Development of a Flexible Strain Sensor for Textile Structures Based on a Conductive Polymer Composite," *Sensors*, 7 (2007), pp. 473-492.

Gratson, Gregory M. et al. "Direct Writing of Three-Dimensional Webs," *Nature*, 428 (2004) p. 386.

Hu, Weili et al., "Elastomeric transparent capacitive sensors based on an interpenetrating composite of silver nanowires and polyurethane," *Appl. Phys. Lett.*, 102 (2013), pp. 083303-1-083303-5; DOI: 10.1063/1.4794143.

Keplinger, Christoph et al., "Stretchable, Transparent, Ionic Conductors," *Science*, 341 (2013), pp. 984-987.

Kim, Dae-Hyeong et al., "Flexible and Stretchable Electronics for Biointegrated Devices," *Annu. Rev. Biomed. Eng.*, 14 (2012), pp. 113-128.

Kim, Dae-Hyeong et al., "Epidermal Electronics," *Science*, 333 (2011) pp. 838-843; DOI: 10.1126/science.1206157; pp. 1-37.

Kim, Dae-Hyeong et al., "Materials and noncoplanar mesh designs for integrated circuits with linear elastic responses to extreme mechanical deformations," *PNAS*, 105, 48 (Dec. 2, 2008), pp. 18675-18680; DOI: 10.1073/pnas.0807476105.

Kim, Dae-Hyeong et al., "Stretchable, Curvilinear Electronics Based on Inorganic Materials," *Advanced Materials*, 22 (2010), pp. 2108-2124.

Kim, Dae-Hyeong et al., "Ultrathin Silicon Circuits With Strain-Isolation Layers and Mesh Layouts for High-Performance Electronics on Fabric, Vinyl, Leather, and Paper," *Advanced Materials*, 21, 36 (2009), pp. 3703-3707; DOI: 10.1002/adma.200900405.

Kim, Yoonseob et al., "Stretchable nanoparticle conductors with self-organized conductive pathways," *Nature*, 500 (Aug. 1, 2013); pp. 59-63; DOI:10.1038/nature12401.

Ko, Heung Cho et al., "A hemispherical electronic eye camera based on compressible silicon optoelectronics," *Nature*, 454 (Aug. 7, 2008), pp. 748-753; DOI: 10.1038/nature07113.

Lee, Curtis et al., "High strain biocompatible polydimethylsiloxane-based conductive graphene and multiwalled carbon nanotube nanocomposite strain sensors," *Applied Physics Letters*, 102 (2013), 183511-1-183511-5; DOI: 10.1063/1.4804580.

Levi, Alessandro et al., "Soft, Transparent, Electronic Skin for Distributed and Multiple Pressure Sensing," *Sensors*, 13 (2013), pp. 6578-6604; DOI:10.3390/s130506578.

Lewis, Jennifer A., "Colloidal Processing of Ceramics," *Journal of the American Ceramic Society*, 83, 10 (2000) pp. 2341-2359.

Lewis, Jennifer A. "Direct Ink Writing of 3D Functional Materials," *Adv. Funct. Mater.*, 16 (2006) pp. 2193-2204.

Lu, Nanshu et al., "Highly Sensitive Skin-Mountable Strain Gauges Based Entirely on Elastomers," *Advanced Functional Materials*, 22 (2012), pp. 4044-4050; DOI: 10.1002/adfm.201200498.

Majidi, C. et al., "A non-differential elastomer curvature sensor for softer-than-skin electronics," *Smart Materials and Structures*, 20 (2011), pp. 105017-1-105017-7; doi:10.1088/0964-1726/20/10/105017.

Martinez, Ramses V. et al., "Robotic Tentacles with Three-Dimensional Mobility Based on Flexible Elastomers," *Advanced Materials*, 25 (2013), pp. 205-212; DOI: 10.1002/adma.201203002.

Mattmann, Corinne et al., "Sensor for Measuring Strain in Textile," *Sensors*, 8 (2008), pp. 3719-3732; DOI: 10.3390/s8063719.

Nawroth, Janna C. et al., "A tissue-engineered jellyfish with biomimetic propulsion," *Nature Biotechnology*, 30, 8 (Aug. 2012); pp. 792-797; DOI:10.1038/nbt.2269.

Park, Yong-Lae et al., "Influence of cross-sectional geometry on the sensitivity and hysteresis of liquid-phase electronic pressure sensors," *Applied Physics Letters*, 101 (2012), pp. 191904-1-191904-4; DOI: 10.1063/1.4767217.

Niu, Xize et al., "Characterizing and Patterning of PDMS-Based Conducting Composites," *Advanced Materials*, 19 (2007), pp. 2682-2686; DOI: 10.1002/adma.200602515.

Pang, Changhyun et al., "A flexible and highly sensitive strain-gauge sensor using reversible interlocking of nanofibres," *Nature Materials*, 11 (Sep. 2012), pp. 795-801; DOI: 10.1038/NMAT3380.

Pang, Changhyun et al., "Recent Advances in Flexible Sensors for Wearable and Implantable Devices," *Journal of Applied Polymer Science* (2013), pp. 1-13; DOI: 10.1002/APP.39461.

Park, Yong-Lae et al., "Design and Fabrication of Soft Artificial Skin Using Embedded Microchannels and Liquid Conductors," *IEEE Sensors Journal*, 12, 8 (Aug. 2012), pp. 2711-2718.

Park, Minwoo et al., "Highly stretchable electric circuits from a composite material of silver nanoparticles and elastomeric fibres," *Nature Nanotechnology*, 7 (Dec. 2012), pp. 803-809; DOI: 10.1038/NNANO.2012.206.

Park, Yong-Lae et al., "Hyperelastic pressure sensing with a liquid-embedded elastomer," *Journal of Micromechanics and Microengineering*, 20 (2010), pp. 125029-1-125029-6; doi:10.1088/0960-1317/20/12/125029.

Pham, Giang T. et al., "Processing and modeling of conductive thermoplastic/carbon nanotube films for strain sensing," *Composites: Part B* 39 (2008), pp. 209-216; doi:10.1016/j.compositesb.2007.02.024.

(56) References Cited

OTHER PUBLICATIONS

Rogers, John A. et al., "Materials and Mechanics for Stretchable Electronics," *Science*, 327 (Mar. 26, 2010), pp. 1603-1607; DOI: 10.1126/science.1182383.

Sekitani, Tsuyoshi et al., "Stretchable, Large-area Organic Electronics," *Advanced Materials*, 22 (2010), pp. 2228-2246; DOI: 10.1002/adma.200904054.

Sekitani, Tsuyoshi et al., "Stretchable active-matrix organic light-emitting diode display using printable elastic conductors," *Nature Materials*, 8 (Jun. 2009), pp. 494-499; DOI: 10.1038/NMAT2459.

Slobodian, P. et al., "A highly-deformable composite composed of an entangled network of electrically-conductive carbon-nanotubes embedded in elastic polyurethane," *Carbon*, 50 (2012), pp. 3446-3453; DOI: 10.1016/j.carbon.2012.03.008.

Shepherd, Robert F. et al., "Multigait soft robot," *PNAS*, 108, 51 (Dec. 20, 2011), pp. 20400-20403; DOI: 10.1073/pnas.1116564108.

So, Ju-Hee et al., "Reversibly Deformable and Mechanically Tunable Fluidic Antennas," *Advanced Functional Materials*, 19 (2009), pp. 3632-3637; DOI: 10.1002/adfm.200900604.

Tee, Benjamin C-K. et al., "An electrically and mechanically self-healing composite with pressure- and flexion-sensitive properties for electronic skin applications," *Nature Nanotechnology*, 7 (Dec. 2012), pp. 825-832; DOI: 10.1038/NNANO.2012.192.

Therriault, Daniel et al., "Fugitive Inks for Direct-Write Assembly of Three-Dimensional Microvascular Networks," *Advanced Materials*, 17, 4 (Feb. 23, 2005), pp. 395-399; DOI: 10.1002/adma.200400481.

Therriault, Daniel et al., "Rheological Behavior of Fugitive Organic Inks for Direct-Write Assembly," *Applied Rheology*, 17, 1 (2007) pp. 10112-1-10112-8.

Vogt, Daniel M. et al., "Design and Characterization of a Soft Multi-Axis Force Sensor Using Embedded Microfluidic Channels," *IEEE Sensors Journal*, 13, 10 (Oct. 2013), pp. 4056-4064.

Wang, Chuan et al., "User-interactive electronic skin for instantaneous pressure visualization," *Nature Materials*, 12 (Oct. 2013), pp. 899-904; DOI: 10.1038/NMAT3711.

Wu, Willie, "Direct-Ink Writing of Microvascular Networks," Dissertation submitted to the Graduate College of the University of Illinois at Urbana-Champaign, 2010, (113 pages).

Wu, Willie et al., "Omnidirectional Printing of 3D Microvascular Networks," *Advanced Materials*, 23 (2011), pp. H178-H183; DOI: 10.1002/adma.201004625.

Xu, Feng et al., "Highly Conductive and Stretchable Silver Nanowire Conductors," *Advanced Materials*, 24 (2012), pp. 5117-5122; DOI: 10.1002/adma.201201886.

Yamada, Takeo et al., "A stretchable carbon nanotube strain sensor for human-motion detection," *Nature Nanotechnology*, 6 (May 2011), pp. 296-301; DOI: 10.1038/NNANO.2011.36.

Yi, Weijing et al., "Investigation of carbon black/silicone elastomer/dimethylsilicone oil composites for flexible strain sensors," *Polymer Testing*, 31 (2012), pp. 677-684; DOI:10.1016/j.polymertesting.2012.03.006.

* cited by examiner

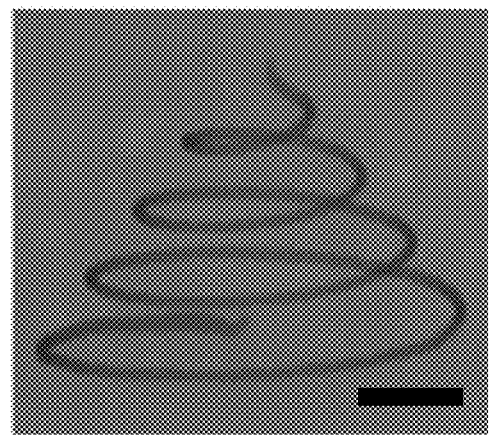
FIG. 6A          FIG. 6B
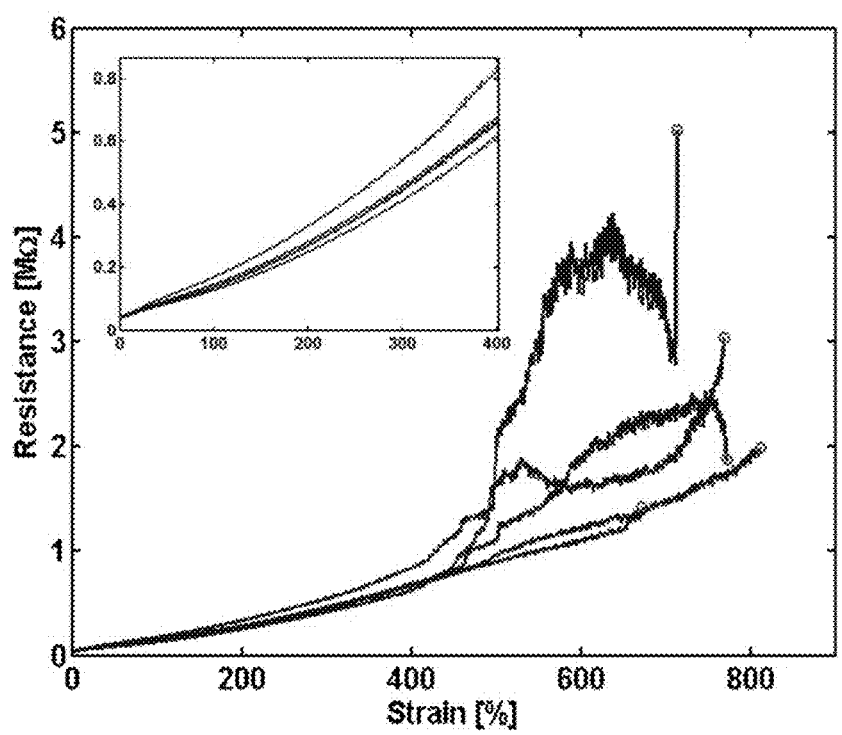
FIG. 7

FIG. 10B
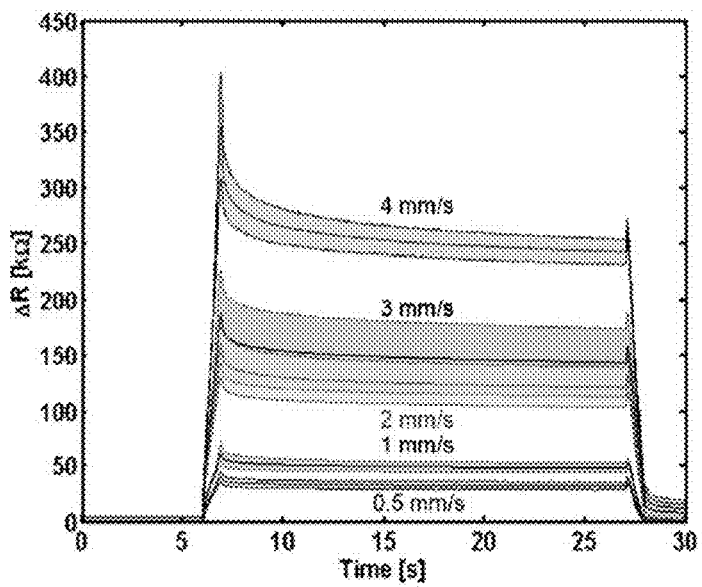
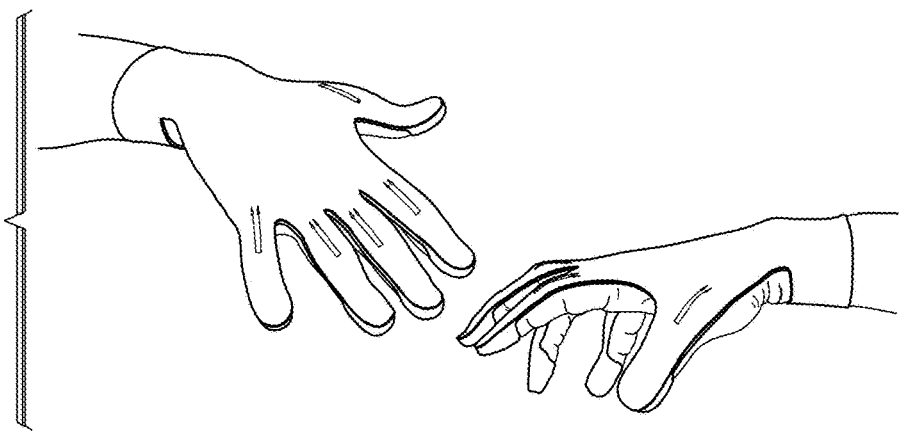
FIG. 11A
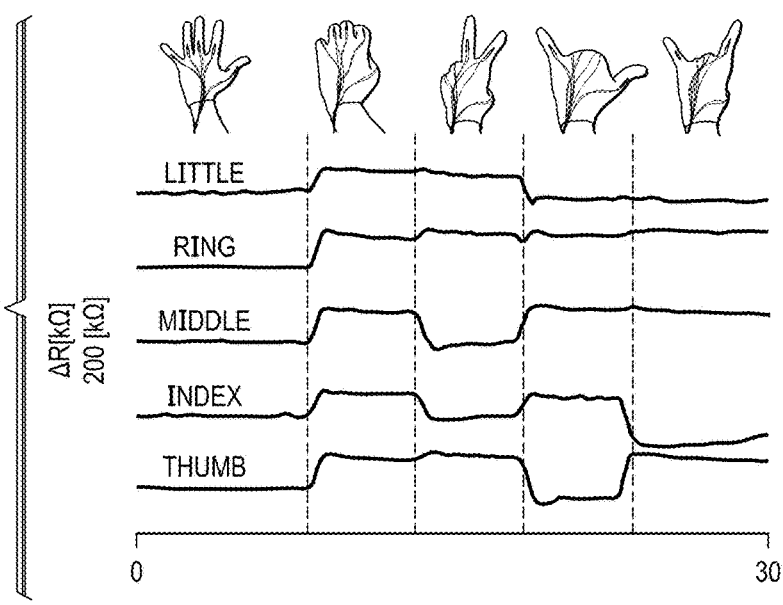
FIG. 11B

FIG. 12
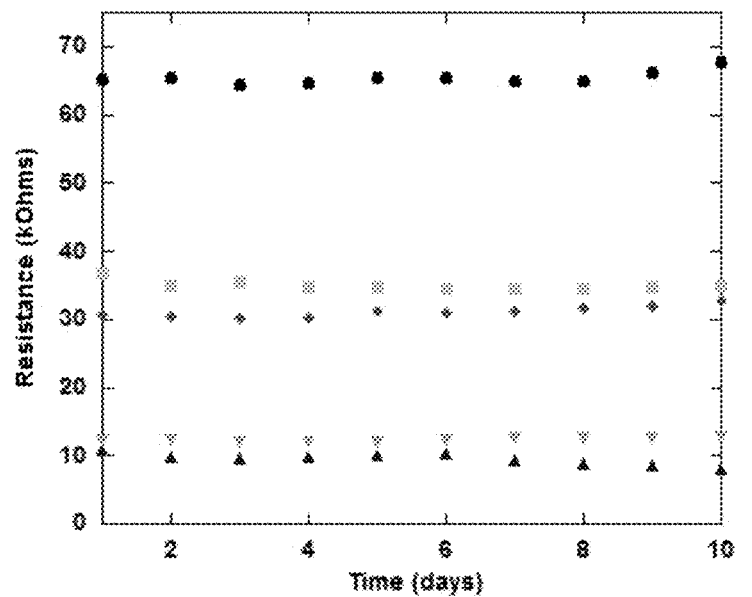
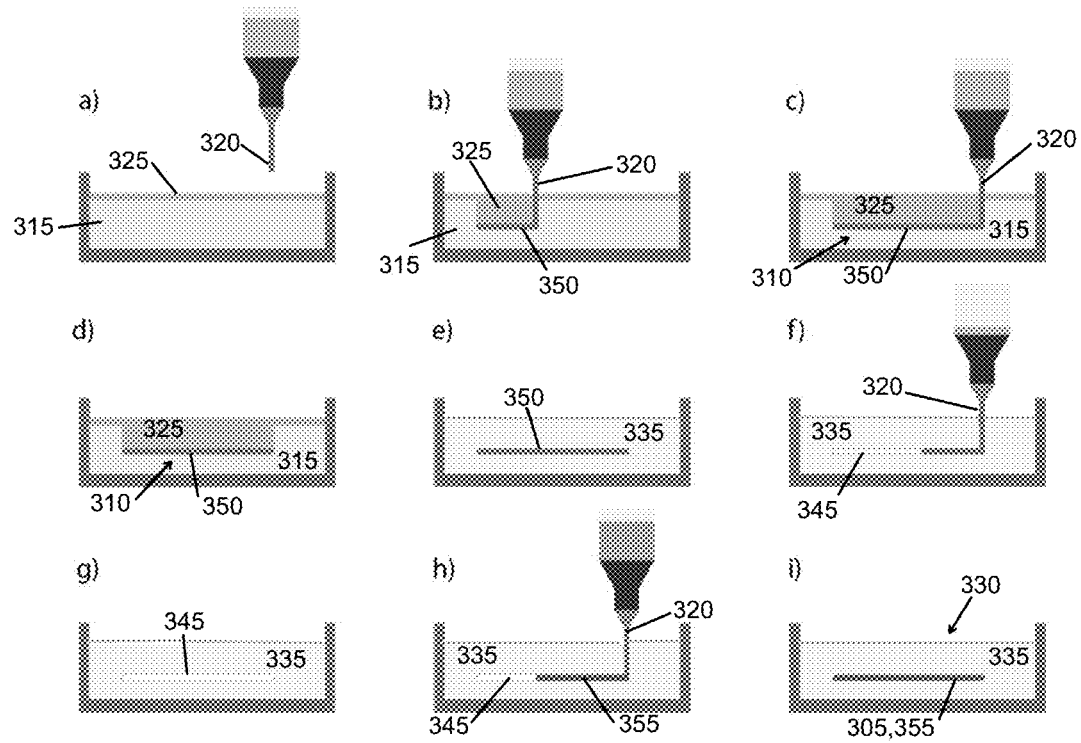
FIGs. 13A-13I

PRINTED STRETCHABLE STRAIN SENSOR

RELATED APPLICATIONS

The present patent document is a continuation of U.S. patent application Ser. No. 15/036,937, filed May 16, 2016, which is the national stage of International Patent Application No. PCT/US2014/065899, filed Nov. 17, 2014, which claims the benefit of priority under 35 U.S.C. § 119(e) to U.S. Provisional Patent Application Ser. No. 61/905,489, filed Nov. 18, 2013. All of the aforementioned patent documents are hereby incorporated by reference in their entirety.

FEDERALLY SPONSORED RESEARCH OR DEVELOPMENT

This invention was made with government support under contract numbers DMR-1305284 and IIS-1226075 awarded by the National Science Foundation. The government has certain rights in the invention.

TECHNICAL FIELD

The present disclosure is related generally to sensor technology and more particularly to the fabrication of stretchable sensors.

BACKGROUND

Since the advent of electronics, advances in fabrication techniques have driven the development of faster, smaller and more efficient devices. However, most of these advances have been focused on rigid, wafer-based electronics. Recent interest in wearable electronics, human/machine interfaces, and soft robotics, among other areas, has fueled the development of an entirely new class of electronic devices—stretchable electronics. One device of particular interest is strain sensors that are both highly conformal and highly extensible, i.e., strain sensors that can envelop arbitrarily shaped objects and maintain functionality over large strains. A device having both characteristics could be used to monitor the motion and deformation of irregular and deformable substrates, such as biological appendages, soft actuators and soft robots.

Current commercially available strain gauges, which include a metal strip on a flexible polymer substrate that may be attached to a test specimen, are neither highly conformal nor highly extensible. If a tensile stress is applied to the test specimen, the length of the metal strip increases and the cross-sectional area decreases, which results in an increase in the electrical resistance (R) of the metal strip. The measured change in resistance $\Delta R$ may be related to the mechanical strain $\varepsilon = \Delta L/L$ (where L is the starting length of the metal strip) by the gauge factor GF, which is defined as $(\Delta R/R)/\varepsilon$. While widely used, such devices are limited to maximum extensibilities of 10-20%.

Due at least in part to the disparate mechanical properties of soft objects and conventional rigid conductors, combining electronic capability with high degrees of conformality and extensibility (e.g., greater than 100%) has proven to be a difficult problem in terms of both materials development and device fabrication. To date, efforts at producing soft sensors that combine deformable electronics with a stretchable carrier have yielded devices hindered by limited extensibility, high cost, poor durability, low repeatability, inefficient fabrication scalability, and/or limited geometric complexity due to lack of form factor control.

BRIEF SUMMARY

A printed stretchable strain sensor comprises a seamless elastomeric body and a strain-sensitive conductive structure embedded therein. The strain-sensitive conductive structure comprises one or more conductive filaments arranged in a continuous pattern.

According to one embodiment, a method of printing a stretchable strain sensor comprises depositing one or more conductive filaments in a predetermined continuous pattern into or onto a support matrix. After the deposition, the support matrix is cured to embed a strain-sensitive conductive structure in a seamless elastomeric body.

According to another embodiment, a method of printing a stretchable strain sensor comprises depositing one or more sacrificial filaments comprising a fugitive ink in a predetermined continuous pattern into or onto a support matrix. The support matrix is cured to form a seamless elastomeric body, and the fugitive ink is removed to create a continuous channel in the seamless elastomeric body. A conductive fluid is flowed into the continuous channel, thereby embedding a strain-sensitive conductive structure in the seamless elastomeric body.

BRIEF DESCRIPTION OF THE DRAWINGS

FIG. 6A shows a CAD drawing of an out-of-plane spiral conductive structure; and FIG. 6B shows an x-ray radiograph of the spiral structure shown in FIG. 6A after e-3DP. Scale bar is 5 mm.

FIG. 7 shows a plot of change in resistance vs. strain for five different sensors produced using a nozzle translation speed (or print speed) of 2 mm/s (see FIG. 8)

FIG. 10B shows a plot depicting resistance change as a function of time for step deformation of each sensor. The center line for each data set represents the average value of all the tested sensors corresponding to a particular size. The shaded regions bounding the center line, represent the standard deviation for all the tested sensors corresponding to a particular size. All cycles went to 100% strain at a crosshead speed of 23 mm/s.

FIG. 11A shows an elastomeric glove with embedded strain-strain sensitive conductive structures. All strain-sensitive conductive structures were 30 mm in length and 4 mm in width. FIG. 11B shows the change in resistance for the strain sensors embedded in the glove for five different finger positions.

FIG. 12 shows a plot of resistance versus time for a conductive filament comprising conductive carbon grease embedded in Ecoflex® (EF). The resistance remains substantially constant through the test indicating that the carbon particles are well stabilized in the silicon oil.

FIGS. 13A-13I are a series of schematics illustrating a second embodiment of an embedded 3D printing process.

DETAILED DESCRIPTION

A novel method for fabricating highly conformal and extensible strain sensors embedded within a seamless elastomeric body is described herein. This fabrication method may be referred to as embedded-3D printing (e-3DP). Strain sensors of varying feature size that exhibit strains up to 400% may be produced individually and in arrays. These soft, stretchable sensors may possess gauge factors akin to their conventional metallic counterparts, and are designed to maintain mechanical integrity during high strain exposure over a large number of cycles. Additionally, e-3DP may be used to create functional devices for biomechanical sensing that may be integrated with a human-machine interface as described below.

3D printing typically refers to a process in which a precursor ink having suitable rheological properties is flowed through a deposition nozzle attached to a moveable micropositioner with x-, y-, and z-direction capability. As the nozzle is moved, a filament comprising the precursor ink may be extruded through the nozzle and continuously deposited on a substrate in a configuration that depends on the motion of the micropositioner. In e-3DP, the substrate comprises a support matrix that can easily deform to allow passage of the nozzle through the support matrix for deposition of the filament. Typically, the support matrix is viscoelastic. Once the nozzle has passed, the support matrix provides adequate stiffness to support the deposited filament. Similarly, the filament may comprise a viscoelastic ink that can readily flow through a microscale nozzle but has a sufficient stiffness when not under stress to maintain its shape after printing.

Figure 1:
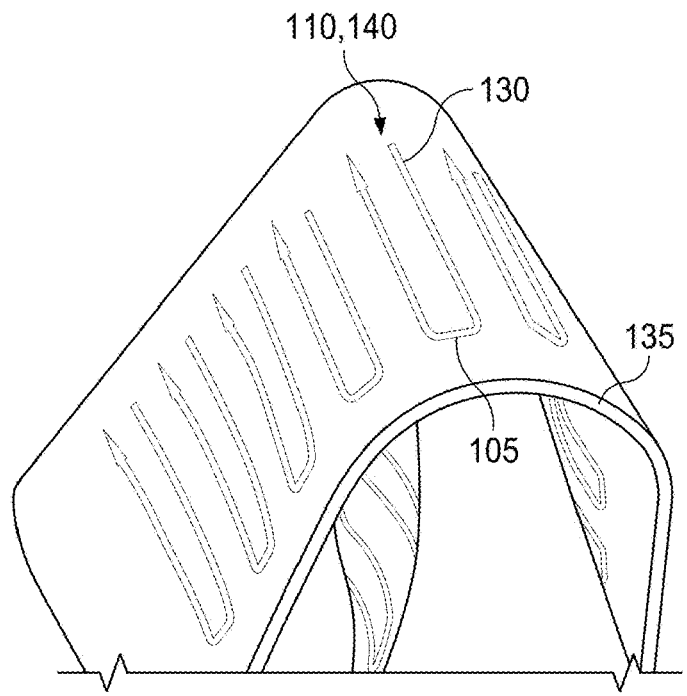
FIG. 1 shows an exemplary array of stretchable sensors comprising a U-shaped conductive structure embedded in a thin elastomeric body.

FIG. 1 shows a plurality of exemplary printed stretchable strain sensors prepared via e-3DP. Each sensor 140 comprises a strain-sensitive conductive structure 130 embedded in a seamless (monolithic) elastomeric body 135. Each strain-sensitive conductive structure 130 comprises one or more conductive filaments 105 arranged in a continuous pattern 110. The elastomeric body 135 comprises a polymer that may be capable of elastic deformations in excess of 100% and up to about 900%. Beneficially, for accurate functioning of the stretchable sensor, the one or more conductive filaments 105 may be viscoelastic and may deform synchronously with the monolithic elastomeric body 135.

Due to the flexibility of the fabrication method, which is described in more detail below, each of the strain-sensitive conductive structures embedded in the seamless elastomeric body may have a predetermined (or "dialed-in") configuration, orientation, size (e.g., cross-sectional area or length), and/or set of properties (e.g., sensitivity (ΔR/Δε)). The predetermined characteristics of any given strain-sensitive conductive structure may be the same as or different from those of any other strain-sensitive conductive structure embedded in the elastomeric body. Each of the strain-sensitive conductive structures may be customized to particular specifications without slowing down, interrupting, adding process steps to, or otherwise negatively impairing the fabrication process.

Figure 2A:
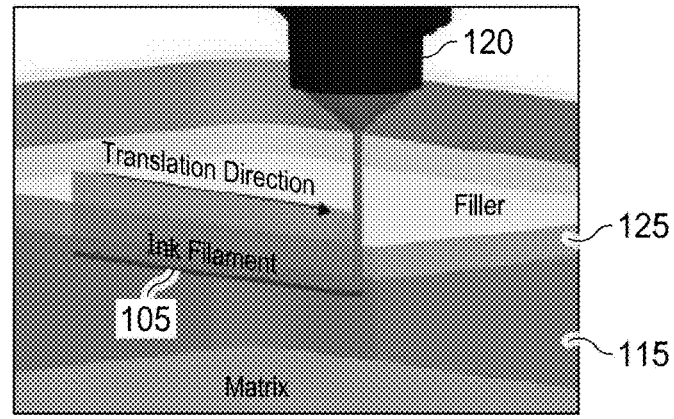
FIG. 2A shows a schematic of a first embodiment of an embedded 3D printing (e-3DP) process.
Figure 2B:
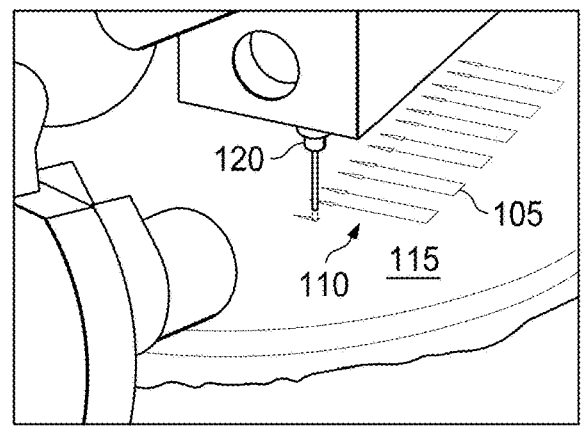
FIG. 2B shows a schematic of an actual e-3DP process being used to fabricate an array of stretchable strain sensors.

Referring to FIGS. 2A and 2B, the method of printing the stretchable strain sensor entails, according to one embodiment, depositing one or more conductive filaments 105 in a predetermined continuous pattern 110 into or onto a support matrix 115, which may be viscoelastic. The one or more conductive filaments 105 may also be viscoelastic and may be electrically or ionically conductive, while the support matrix 115 may be electrically insulating. Before being deposited, the one or more conductive filaments 105 may be extruded from a moving nozzle 120. A fluid filler layer 125 may overlie the support matrix 115 to fill in any air gaps or voids that may be created during deposition of the one or more conductive filaments 105. After or during deposition, the support matrix 115 and the optional fluid filler 125 may be cured (e.g., by application of UV light, heat, or chemical curing agent, etc.) to embed one or more strain-sensitive conductive structures 130 in a seamless elastomeric body 135. Prior to deposition, the support matrix 115 may be in an uncured or partially cured state.

Referring now to FIGS. 13A to 13I, the method of printing the stretchable strain sensor may entail, according to a second embodiment, depositing one or more sacrificial filaments 350 comprising a fugitive ink in a predetermined continuous pattern 310 into or onto a support matrix 315, which may be viscoelastic and electrically insulating, as described above. The one or more sacrificial filaments 350 may also be viscoelastic. Before being deposited, the one or more sacrificial filaments 350 may be extruded from a moving nozzle 320, as shown in FIG. 13B. A fluid filler layer 325 may overlie the support matrix 315 to fill in any air gaps or voids that may be created during deposition of the one or more sacrificial filaments 350. After or during deposition, the support matrix 315 and the optional fluid filler layer 325 may be cured (e.g., by application of UV light, heat, or chemical curing agent, etc.) to form a seamless elastomeric body 335, as illustrated in FIGS. 13D and 13E; prior to deposition, the support matrix 315 may be in an uncured or partially cured state. After or during curing, the fugitive ink may be removed to create a continuous channel 345 in the seamless elastomeric body 335, as shown in FIGS. 13F and 13G. A conductive fluid 355 may then be flowed into the continuous channel 345, as shown in FIGS. 13H and 13I, to embed a strain-sensitive conductive structure 330 in the seamless elastomeric body 335. Once the conductive fluid 355 is infilled into the continuous channel 345, it is constrained to have a filamentary shape; thus, the conductive fluid 355 within the channel 345 may be referred to as conductive filament 305, and it may be understood to behave similarly to a conductive filament deposited as described in the previous embodiment.

Figure 3A:
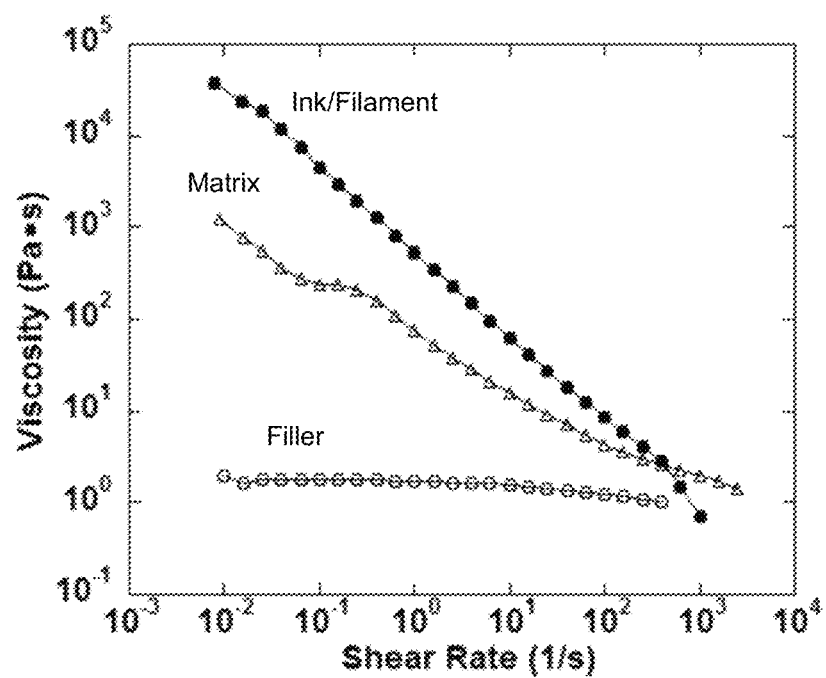
FIG. 3A shows viscosity as a function of shear rate for an exemplary conductive filament (ink), supporting matrix and filler layer.

Any or all of the filaments deposited on the substrate—including the sacrificial filament(s) and/or conductive filament(s)—may be extruded from a nozzle before being deposited. In the description that follows, when the term "filament" is used generically without specifying either "sacrificial filament" or "conductive filament," the description may be understood to apply to either or both types of filaments. As would be recognized by one of ordinary skill in the art, a filament or support matrix that is described as "viscoelastic" has a strain-rate dependent viscosity. Specifically, the one or more filaments and the support matrix may exhibit shear-thinning behavior, where the viscosity decreases with shear rate, as shown for example in FIG. 3A. This attribute facilitates extrusion of the one or more filaments through the nozzle, and it also facilitates translation of the nozzle through the support matrix during the deposition process. Once the shear stress of the nozzle is removed, the filament exhibits a sufficient stiffness to maintain its shape in the support matrix, and the support matrix exhibits a sufficient stiffness to support the filament. Advantageously, a plateau value of shear elastic modulus $G'_f$ of the filament may be from about 10 times to about 15 times a plateau value of shear elastic modulus $G'_s$ of the support matrix, as can be seen from FIG. 3B. Generally speaking, the plateau value of shear elastic modulus $G'_f$ of the filament may be from about 10 times to about 1000 times, or from about 10 times to 100 times, a plateau value of shear elastic modulus $G'_s$ of the support matrix.

The filaments may be formed from precursor inks (e.g., conductive inks or fugitive inks) having a suitable composition and rheological properties. For example, the precursor inks may be viscoelastic and comprise a viscosity with a non-linear shear dependence; the viscosity of the precursor inks may fall in the range of from about 0.001 Pa-sec to about 10,000 Pa-sec. The precursor inks may optionally include viscosifiers to help control the rheological properties.

The fluid filler layer may comprise a Newtonian fluid having a low and substantially strain rate independent viscosity. The viscosity of the fluid filler layer may be very low, ideally less than about 1 Pa·s. The shear elastic modulus G' of the fluid filler layer is preferably negligible compared to that of the support matrix. Advantageously, the fluid filler layer and the support matrix may comprise the same polymer precursor to facilitate the formation of a seamless monolithic elastomeric body upon curing. However, due to the different viscosity requirements of the fluid filler layer and the support matrix, the polymer precursor may comprise thickening or thinning agents to adjust the rheology as appropriate. Accordingly, the fluid filler layer and the support matrix may be said to be chemically identical but rheologically dissimilar.

Figure 3B:
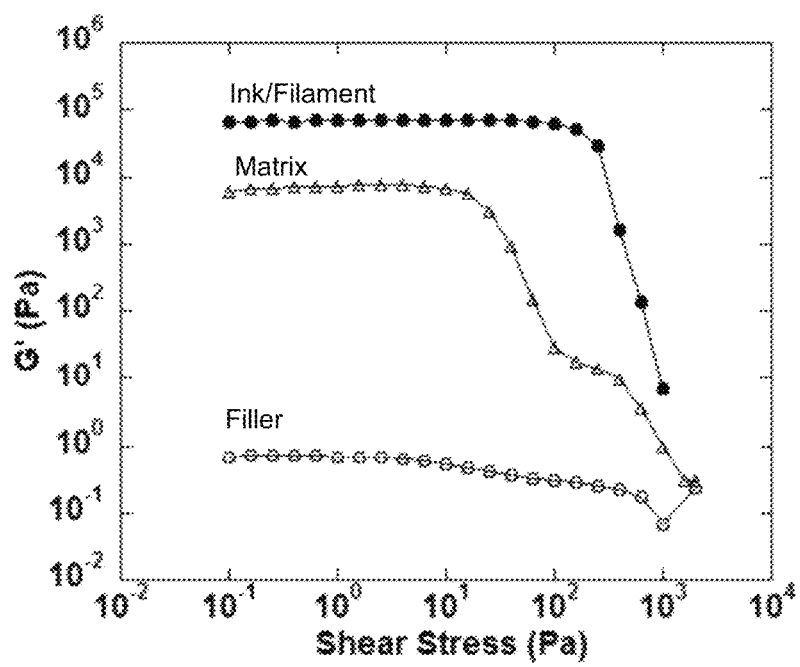
FIG. 3B shows shear elastic modulus G' as a function of shear stress for an exemplary conductive filament (ink), supporting matrix and filler layer.
Figure 4A:
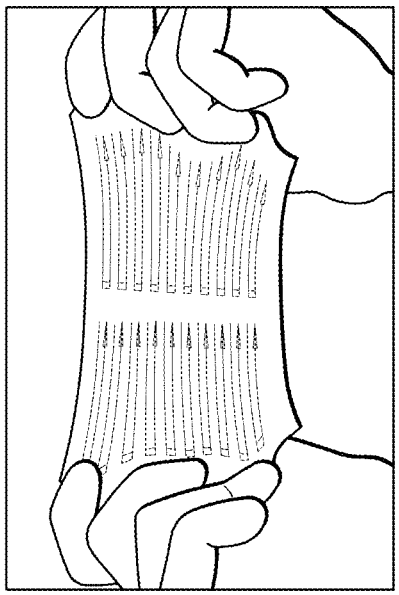
FIGS. 4A-4D are schematics showing sheets of stretchable strain sensors having a thickness (elastomer) of about 1 mm; the sensors are highly extensible (FIG. 4B), conformal (FIG. 4C), and may be readily adhered to surfaces such as skin (FIG. 4D).
Figure 4B:
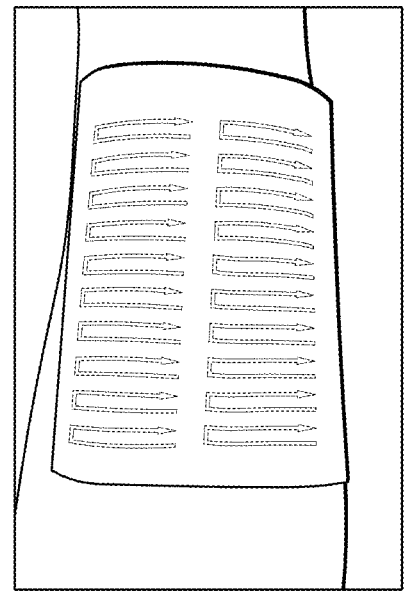
Figure 4C:
Figure 4D:
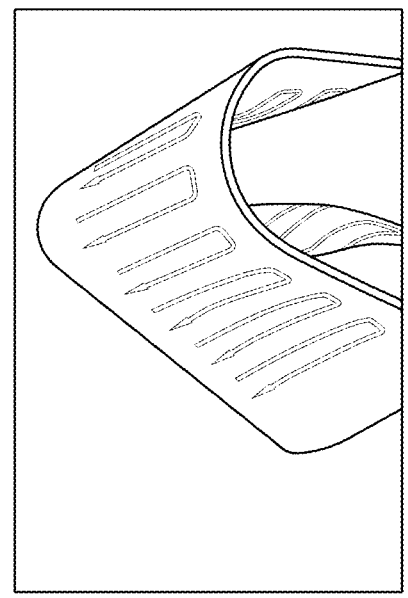

For example, a silicone elastomer, such as the commercially available Ecoflex® 00-30 ("EF," Smooth-On, Inc., Easton, Pa.) may be used for the fluid filler layer and/or the support matrix. When cured, EF exhibits a large extensibility (900% elongation at break) and softness (Shore Hardness 00-30), making it suitable for soft sensors. The support matrix (EFM) and filler layer (EFF) may be formulated by modifying uncured EF with thickening (e.g., Thi-Vex, Smooth-On, Inc., Easton, Pa.) and thinning (e.g., Silicone Thinner, Smooth-On, Inc. Easton, Pa.) agents, respectively, to obtain the desired rheological characteristics. (Exemplary formulation details are provided in the Experimental section below). FIG. 3B shows that the shear elastic modulus G' of the matrix is within 1.5 decades of the G' of the ink, while the filler is a low viscosity Newtonian fluid with a negligible shear elastic modulus G' compared to that of both the support matrix and the filament(s).

Any elastomer with suitable rheological characteristics in an uncured or partially cured state may be suitable for use as the support matrix and/or the fluid filler layer, such as, for example, polydimethylsiloxane (PDMS), Pluronic F127 (BASF, Florham Park, N.J.), or other hydrogels including those derived from collagen, hyaluronate, fibrin, alginate, agarose, and/or chitosan. While it may be advantageous for the support matrix to be viscoelastic, it is also contemplated that the support matrix may comprise a highly viscous material having a shear-rate independent viscosity.

The elastomeric body formed by curing the support matrix may have any desired dimension. For many envisioned embodiments, the elastomeric body comprises a thin sheet having a thickness of about 100 mm or less, about 50 mm or less, about 10 mm or less, or about 1 mm or less, that may readily conform to irregular substrates, such as body appendages, for use.

Because of the fabrication process, the strain-sensitive conductive structure may comprise one or more conductive filaments. As set forth above, the conductive filament(s) may be deposited by extrusion through a nozzle or may be formed by infilling of a channel. A single continuous conductive filament, or more than one conductive filament deposited in contact with a previously deposited conductive filament (e.g., placed end-to-end with), may define the strain-sensitive conductive structure. Each of the one or more conductive filaments may have a substantially circular transverse cross-sectional area, and thus the strain-sensitive conductive structure may also have a substantially circular transverse cross-sectional area at some or all points along the structure. In addition, the thickness or width of the strain-sensitive conductive structure at any given point may be defined by the diameter of one of the conductive filament(s). The diameter may range from about 10 microns to about to about 10 mm, and more typically from about 100 microns (0.1 mm) to about 1 mm, depending on the process parameters, as discussed below.

The one or more conductive filaments may comprise a shear-thinning material selected from the group consisting of: silicone oil, mineral oil, an organic solvent, an ionic liquid, a hydrogel, an organogel, and a liquid metal, such as a gallium-indium eutectic alloy. The shear-thinning material may also be selected so that it does not undergo curing under the conditions employed to cure the support matrix and the fluid filler layer. Accordingly, the conductive filament may remain in an uncured state. In some cases, however, the shear-thinning material and thus the conductive filament may be cured (e.g., by UV light, heat, or chemical curing agent). The viscosity of the one or more conductive filaments may fall in the range of from about 0.001 Pa-sec to about 10,000 Pa-sec, and the one or more conductive filaments may optionally include viscosifiers to help control the rheological properties.

The one or more conductive filaments may be intrinsically electrically conductive or may include additives that render the filament(s) electrically conductive. For example, in the former case, the one or more conductive filaments may comprise an intrinsically conductive polymer, such as polyaniline, polyacetylene, and/or polypyrrole, that has suitable rheological properties. An ionically conductive hydrogel, such as alginate, may also provide the desired combination of conductivity and viscoelasticity. In the latter case, where additives are used to impart electrical conductivity to the conductive filament(s), the additives may comprise electrically conductive particles that are substantially spherical, irregular, acicular or elongated in morphology. Advantageously, the conductive particles may be high surface area particles having one or more dimensions in the sub-100 nm range (e.g., nanoparticles, nanowires, nanotubes). The conductive particles may comprise carbon, silver, nickel, aluminum, gold, platinum, palladium, copper, and/or another conductive metal or metal alloy. Advantageously, the conductive particles or other additive may be present at a concentration sufficient for the formation of a percolating conductive network through the entire length of the conductive filament (before and during deformation) without detrimentally affecting the rheology of the filament. For example, commercially available conductive carbon grease (MG Chemicals; Surrey, BC, Canada), which is employed in the examples described below, includes high surface area carbon particles (carbon black) dispersed in dimethylpolysiloxane (silicone oil) at a concentration of from about 20-22 wt. % (MSDS sheet for 846 Conductive Carbon Grease).

When the conductive filament is formed by infilling a continuous channel in the elastomeric body with a conductive fluid, the infilling may be carried out by injection of the conductive fluid into the channel at a suitable pressure or flow rate. The conductive fluid may be injected into the channel at one end while a low vacuum is applied to the other end of the channel to ensure complete channel filling. Exemplary conductive fluids that may be used for the infilling include liquid metals such as gallium-indium eutectic alloys (e.g., 75 wt. % Ga, 25 wt. % In) and mercury (Hg). Other fluids may include, but are not limited to, dispersions of metal particles (e.g., silver particles) in aqueous or non-aqueous media, aqueous and non-aqueous ionic fluids, intrinsically conductive polymers and hydrogels, and polymer and hydrogel composites comprising conductive particles dispersed in a non-conductive continuum. Such conductive fluids may not have the rheological properties to be directly deposited by 3D printing.

Suitable fugitive inks for forming the sacrificial filaments (when employed for the method) may include, for example, Pluronic F127, Pluronic F123, agarose, sugar, wax, and fatty oils (e.g., animal fat derived oils such as Crisco). Pluronic F127 comprises a hydrophobic poly(propylene oxide) (PPO) segment and two hydrophilic poly(ethylene oxide) (PEO) segments arranged in a PEO-PPO-PEO configuration. Pluronic F127 undergoes thermally reversible gelation above a critical micelle concentration (CMC; about 21 wt. %) and the gelation temperature. The gelation temperature decreases from approximately 10° C. to 4° C. as the PEO-PPO-PEO concentration increases. When both of these critical parameters are exceeded, micelles form as the hydrophilic PEO segments self-assemble into corona that are well solvated by water, while the hydrophobic PPO segments tightly associate within the micelle cores. However, below the gelation temperature, the hydrophobic PPO units are hydrated, such that individual PEO-PPO-PEO species become soluble in water giving rise to a gel-to-fluid transition for systems whose concentration exceeds the CMC. Thus, the material liquifies upon cooling below the gel point.

Generally speaking, the sacrificial filament may be liquefied to remove the fugitive ink. Liquefication can occur via a thermal transition, pH change, reaction mechanism, or another stimulus. Once liquefied, a vacuum may be applied to the channel to withdraw the ink. Alternative withdrawal methods such as drying, leaching, dissolution, self-evacuation or others are possible.

For a fugitive ink that undergoes a gel-to-fluid transition as described above, cooling of the elastomeric body after curing may be effective for removal of the fugitive ink. To remove Pluronic F127, the elastomeric body may be cooled to a temperature of no more than about 1° C., depending on the concentration. It is also contemplated that the fugitive ink may be dissolved in a suitable aqueous solution for removal. Once the fugitive ink is liquefied or dissolved, a vacuum may be applied to an exposed end of the channel to extract the ink, as shown in FIG. 13H.

The continuous pattern formed by the one or more conductive or sacrificial filaments may be any continuous geometric pattern, such as a line, U-shape, sinusoid, spiral, or meander which may, in some embodiments, maximize the length of portion(s) of the sensor that are aligned along a particular axis. For example, each of the exemplary strain-sensitive conductive structures shown in FIG. 1 have a U-shaped configuration with two substantially parallel elongated portions that may be aligned along a particular direction for use to provide increased sensitivity to strains in that direction. The continuous pattern may have a two-dimensional (planar) or a three-dimensional (out of plane) geometry, and the strain-sensitive conductive structure may have any desired orientation within the elastomeric body.

A plurality of the strain-sensitive conductive structures may be embedded in the seamless elastomeric body in a predetermined arrangement. The arrangement may be an ordered arrangement or a disordered arrangement. In one example, the strain-sensitive conductive structures may be positioned in one or more lines or in a two-dimensional array. Referring to FIGS. 4A-4D, an exemplary 10×2 array of strain-sensitive conductive structures is shown embedded in a 1 mm thick elastomeric body. The sensors maintain electrical continuity over large strains and can be readily attached to a variety of deformable surfaces, including human skin.

The strain-sensitive conductive structures may also or alternatively be arranged in a three-dimensional array or in a stack. For example, the printed stretchable sensor may include a first layer of strain-sensitive conductive structure(s) each having the elongated portions oriented along an x-axis; a second layer of strain-sensitive conductive structure(s) each having the elongated portions oriented along a y-axis; and a third layer of strain-sensitive conductive structure(s) each having the elongated portions oriented along a z-axis, or along a non-orthogonal direction having both x and y coordinates. Each of the first, second and third layers may electrically isolated from each other by the elastomeric matrix. In some embodiments, conductive lines extending in the z-direction may connect the strain sensitive structure(s) in one layer with the strain sensitive structure(s) in an adjacent layer. In this way, one or more stretchable sensors providing multi-axis strain measurement capability may be produced in a single seamless elastomeric body.

Figure 5A:
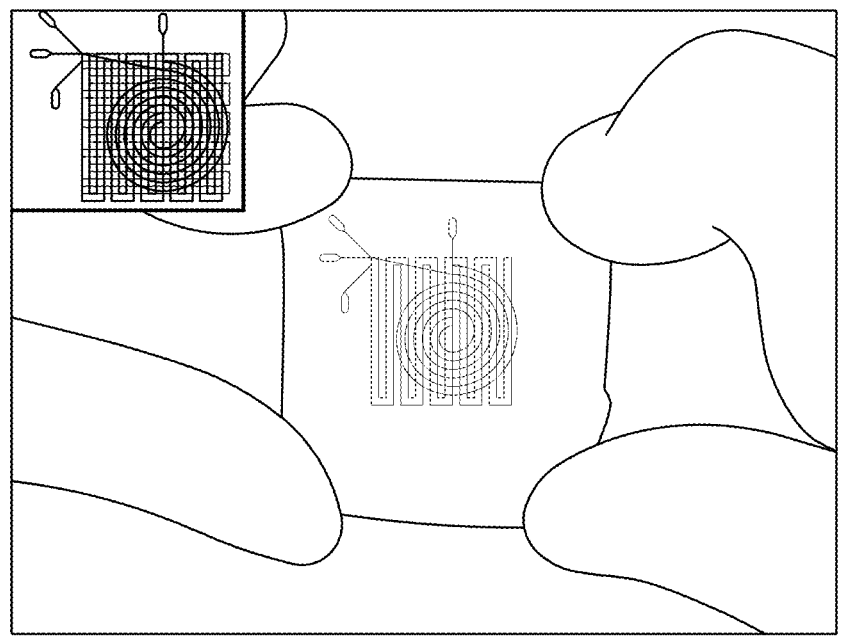
FIGS. 5A and 5B show a three-layered arrangement of strain sensors in the unstrained (FIG. 5A) and highly strained (FIG. 5B) states. The inset shows a CAD design of the continuous pattern formed by the strain-sensitive conductive structure in each layer.
Figure 5B:
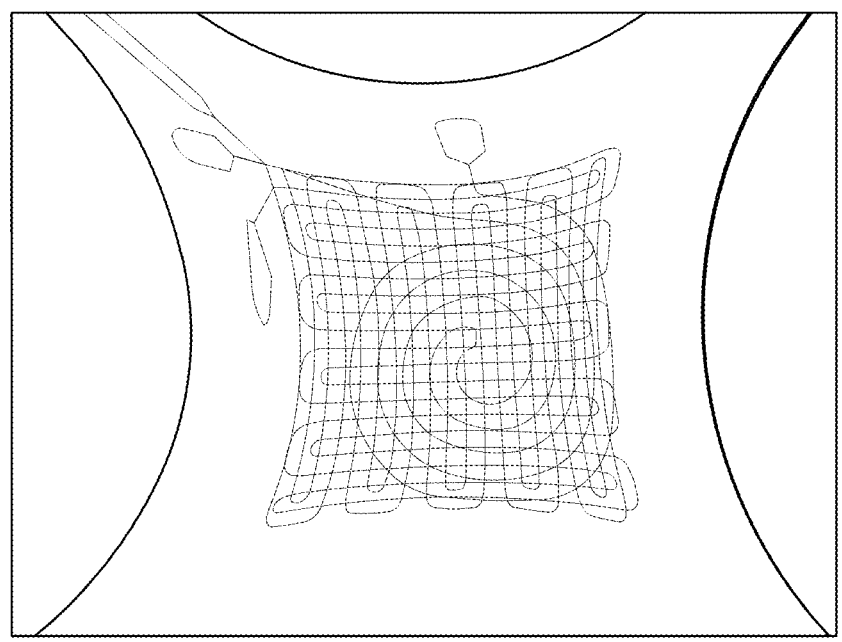

Another example of a stacked sensor configuration is shown in FIGS. 5A and 5B. The stretchable sensor has a three-layer geometry, where each layer comprises a single, continuous conductive path that is electrically isolated from the underlying layer by the elastomeric matrix. The resulting sensor includes three fully continuous strain-sensitive conductive structures of up to 20 mm by 20 mm in unstrained size stacked in a seamless monolithic elastomeric body. FIG. 5A shows the sensor with no applied strain, and FIG. 5B shows the sensor in a highly strained state. The continuity of the design in each layer persists even at high strains.

An exemplary sensor having a three-dimensional out-of-plane geometry (a tapered spiral) is shown in FIGS. 6A-6B, where FIG. 6A shows a computer aided design (CAD) drawing and FIG. 6B shows an x-ray radiograph of the sensor. To facilitate x-ray imaging of the embedded spiral, the conductive filament deposited in the support matrix included silver particles, which provided an adequate electron density difference between the cured elastomeric body and the embedded strain-sensitive conductive structure for imaging.

To embed more than one strain-sensitive conductive structure in the seamless elastomeric body, one or more deposition nozzles may be employed. For example, two or more, three or more, four or more, five or more and up to N nozzles may be used for extruding the filaments, where $1 \leq N \leq 1024$, and more typically N is no more than 512, N is no more than 256, N is no more than 128, or N is no more than 64. The filaments may be extruded from the N nozzles sequentially in a serial deposition process or simultaneously in a parallel deposition process, and each nozzle may contain the same or a different precursor ink for deposition of the filament(s) used to form each strain-sensitive conductive structure. It is also contemplated that the deposition may include both parallel and serial deposition steps. To facilitate sequential or serial printing, the nozzles can be independently controlled in the z-direction.

The predetermined continuous pattern formed by the one or more filaments may be determined by the path of the nozzle, and the cross-sectional area of each filament (and thus of the strain-sensitive conductive structure) can be varied by adjusting variables such as nozzle size, injection pressure, and/or translation speed.

Each nozzle may have an inner diameter of from about 10 microns to about 1 mm in size, and more typically from about 50 microns to about 500 microns. The size of the nozzle may be selected depending on the desired conductive filament diameter. Depending on the injection pressure and the nozzle translation speed, the filament may have a diameter ranging from about 10 microns to about 10 mm, and more typically from about 100 microns (0.1 mm) to about 1 mm. The nozzles may be moved and the filaments may be deposited at print speeds as high as about 3 m/s (e.g., from about 1 cm/s to about 3 m/s), and are more typically in the range of from about 1 mm/s to about 500 mm/s, from about 0.1 mm/s to about 100 mm/s, or from about 0.5 mm/s to about 10 mm/s.

The precursor ink(s) fed to the one or more nozzles may be housed in separate syringe barrels that may be individually connected to a nozzle for printing by way of a Luer-Lok™ or other connector. The extrusion of each of the filaments may take place under an applied or injection pressure of from about 1 psi to about 1000 psi, from about 10 psi to about 500 psi, or from about 20 psi to about 100 psi. The pressure during extrusion may be constant or it may be varied. By using alternative pressure sources, pressures of higher than 100 psi and/or less than 1 psi, for example, may be applied during printing. A variable pressure may yield a filament having a diameter that varies along the length of the filament. The extrusion may be carried out at ambient or room temperature conditions (e.g., from about 18° C. to about 25° C.).

During the extrusion and deposition of each filament, the nozzle may be moved along a predetermined path (e.g., from $(x_1, y_1, z_1)$ to $(x_2, y_2, z_2)$) determined by the desired continuous pattern with a positional accuracy of within ±200 microns, within ±100 microns, within ±50 microns, within ±10 microns, or within ±1 micron. Accordingly, the filaments may be deposited with a positional accuracy of within ±200 microns, within ±100 microns, within ±50 microns, within ±10 microns, or within ±1 micron.

The predetermined path of the nozzle may have an XY boundary area of at least about 2400 cm$^2$, at least about 2700 cm$^2$ and up to about 1 m$^2$ as determined by the size of the reservoir. For example, the reservoir may have a length of from about 60 cm to about 100 cm and a width of from about 40 cm to about 100 cm. Each print head may be moved in the z-direction a distance from about 10 cm to about 50 cm, or about 15 to about 30 cm.

The fabrication process enables structural characteristics to be achieved in the stretchable sensor that may provide improved mechanical integrity and reliability compared to flexible sensors made by other methods. For example, as described above, the stretchable sensor comprises a seamless (monolithic) elastomeric body that has a very low risk of delamination failure—in stark contrast to previous devices formed from bonded polymer layers. In addition, by fabricating the strain sensitive structure and the surrounding elastomeric walls with a rounded transverse cross-section, the stress concentrations associated with sharp corners, which are found in previous devices having rectangular channels, are avoided. This is important since regions of high stress concentration may be associated with fatigue crack initiation and ultimately fatigue failure. Also, due to the rounded cross-sectional geometry, the resistance to flow or motion of the strain-sensitive conductive structure in response to external strains is reduced. This may be critical due to the importance of maintaining a percolated network of conductive particles during high strain exposure, as well as achieving synchronous deformation of the strain-sensitive conductive structure with the monolithic elastomeric body.

To evaluate the failure strain of the sensors, five sensors produced at a nozzle translation speed of 2 mm/s (see FIG. 8) were extended at a crosshead speed of 5 mm/s until failure. All tested sensors exhibited consistent, predictable electrical response up to ~400% strain (FIG. 7). Between ~400-800% strain, electrical performance became more erratic. Between ~700-800% strain, the sensors mechanically failed. Each sensor failed as a result of tearing at the wire/sensor interface rather than from any defects in the monolithic elastomeric sample.

The data in Table I below, which were obtained from cycling tests of sensors printed at 2 mm/s, show that the sensors can be cycled for thousands of cycles even under aggressive conditions (high strains (e.g., 100%) and high strain rates (e.g., 23 mm/s)) without mechanical failure. Consistent with these results, the stretchable sensor may have a sufficient mechanical integrity to withstand cyclic loading from 0% to 10% strain at a strain rate of 10 mm/s or higher for at least 9000 cycles without failure. The sensor may also be able to withstand cyclic loading from 0% to 100% strain at a strain rate of 10 mm/s or higher for at least 7000 cycles without failure.

TABLE I

Minimum Number of Cycles Without Failure for Fatigue Tests Conducted Under Various % Strain and Strain Rate Conditions

| % strain | Strain rate | Number of cycles before test halted |
|---|---|---|
| 100 | 1 mm/s | 500 cycles |
| 100 | 10 mm/s | 3600 cycles |
| 100 | 23 mm/s | 7000 cycles |
| 50 | 1 mm/s | 1000 cycles |
| 50 | 10 mm/s | 5400 cycles |
| 10 | 1 mm/s | 3600 cycles |
| 10 | 10 mm/s | 9000 cycles |

Figure 8:
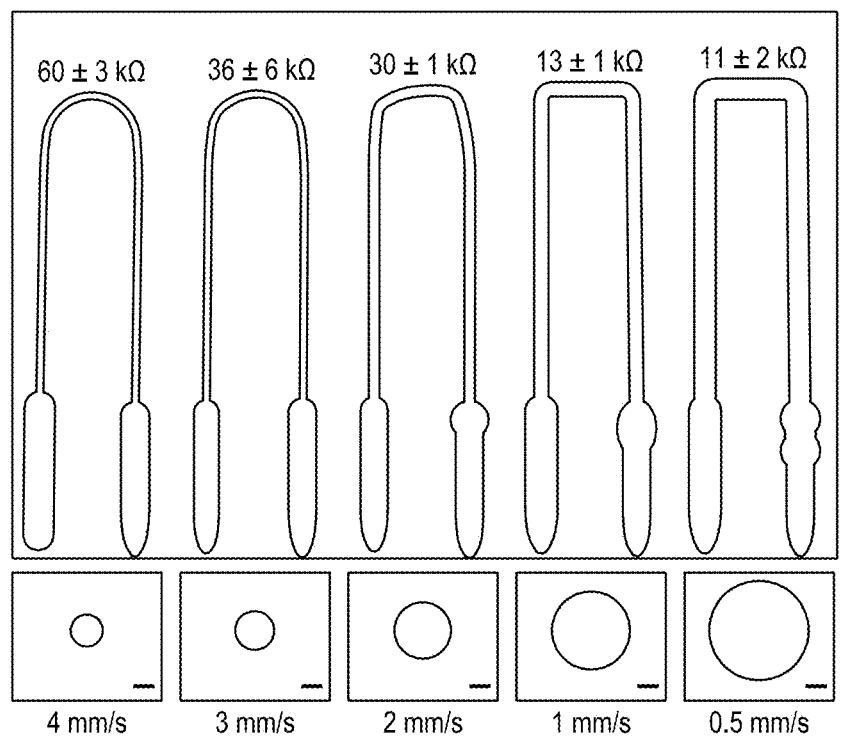
FIG. 8 shows a schematic of exemplary strain-sensitive conductive structures produced at different nozzle translation speeds (or print speeds) while maintaining constant pressure and nozzle size. The transverse cross-sectional area and resistance of each structure are shown.

To explore the effect of translation speed on the cross-section of the strain-sensitive conductive structure, a continuous pattern (a U-shape in these examples) is printed at different nozzle translation speeds (4 mm/s, 3 mm/s, 2 mm/s, 1 mm/s and 0.5 mm/s), keeping the nozzle diameter and the injection pressure constant. The nozzle used for printing has an inner diameter of 410 µm, and an injection pressure of 50 psi is used. As shown in FIG. 8, the transverse cross-section of the conductive filament (and thus the transverse cross-section of the strain-sensitive conductive structure) decreases with increasing translation speed, resulting in higher nominal resistances for the narrower strain-sensitive conductive structures, up to a maximum resistance of 60±3 kΩ for a cross-section of 0.066±0.01 mm². (All± values correspond to one standard deviation). Insets show the respective cross-sections of the strain-sensitive conductive structures, which are, from left to right in mm². 0.066±0.01, 0.12±0.02, 0.21±0.02, 0.46±0.01, and 0.71±0.05. As printing speed increases, cross-sectional area decreases, increasing the native resistance. (Scale bar=200 µm). The functional portion of each sensor (the strain-sensitive conductive structure) is 4 mm×15 mm. The connection portions of each sensor, which were fabricated to facilitate electrical connectivity, are 5 mm long. In addition to narrower filaments, higher translation speeds may lead to a loss of fidelity at the corners of the U-shape, creating rounded features. If this rounding effect is not desired, it may be mitigated by decelerating the nozzle near areas of abrupt directional change.

Figure 9A:
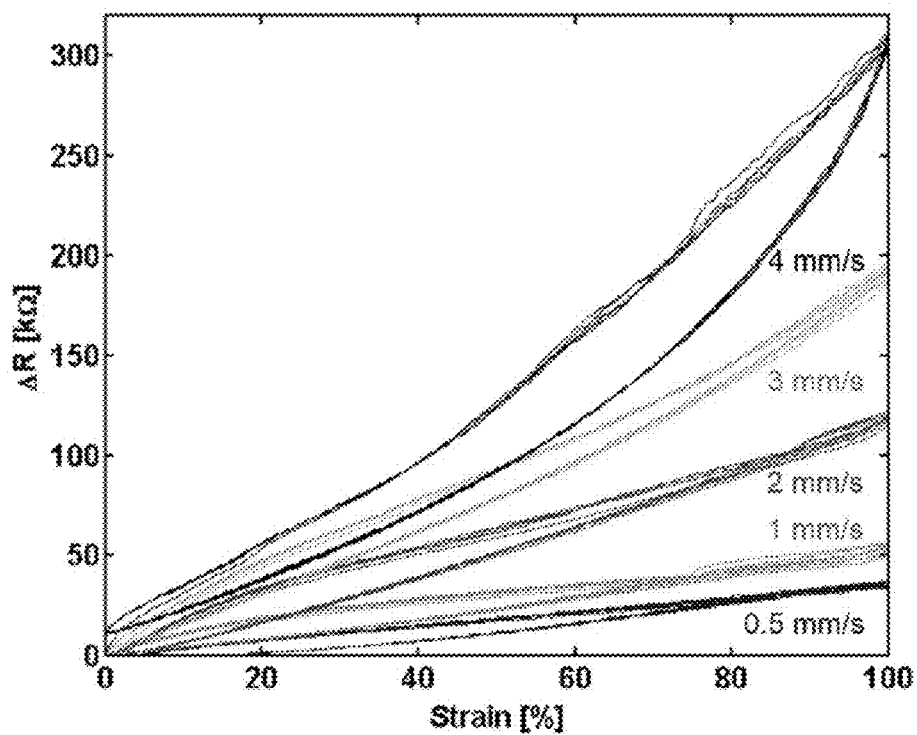
FIG. 9A shows representative performance for sensors produced at different print speeds (and thus having different cross-sectional areas) under cyclic deformation. Each sensor was cycled 5 times; all cycles went to 100% strain at a crosshead speed of 2.96 mm/s.
Figure 9B:
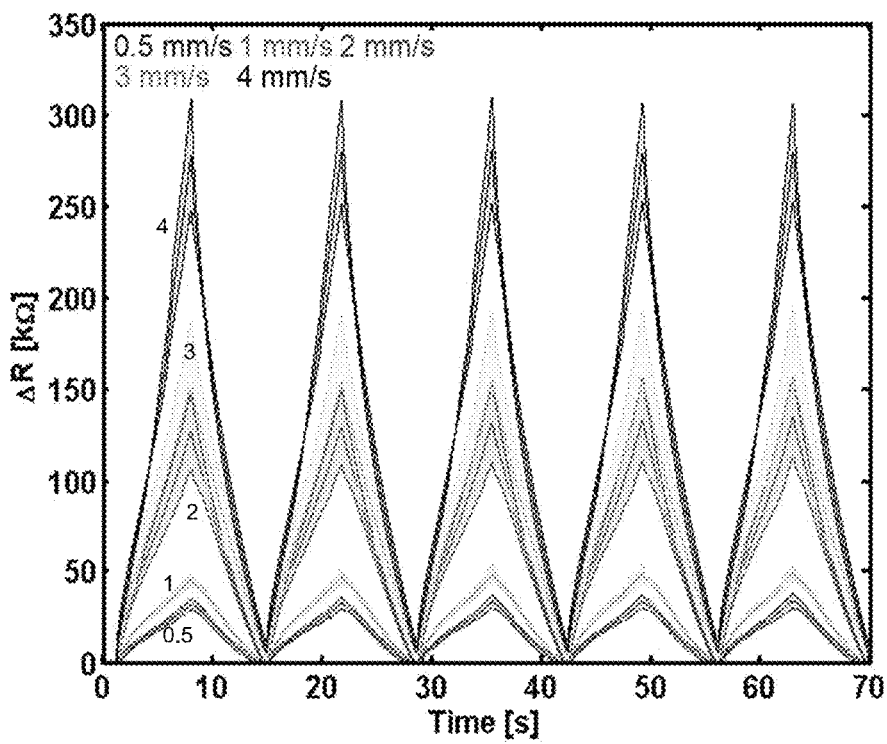
FIG. 9B shows a plot depicting resistance change as a function of time for 5 cycles for each sensor size (cross-sectional area). All cycles went to 100% strain at a crosshead speed of 2.96 mm/s. The center line for each data set represents the average value of all the tested sensors of a particular size. The shaded regions bounding the center line, represent the standard deviation for all the tested sensors corresponding to a particular size.

To evaluate the effect of printing parameters on sensor performance, the sensors prepared as described above are extended to 100% strain at a crosshead speed of 2.96 mm/s and relaxed back to the zero strain condition at the same rate. The extend-relax cycle is repeated five times for each sensor. Sensors printed at higher speeds (and having smaller transverse cross-sections) are shown to provide a larger resistance change (ΔR) for the same strain compared to sensors printed at lower speeds (and having larger transverse cross-sections) (FIGS. 9A-9B). This indicates that the apparent sensor sensitivity can readily be controlled by adjusting the translation speed. The gauge factor of each sensor is determined by normalizing the apparent sensor sensitivity with respect to the native resistance of the unstrained sensor. The gauge factor for all sensors collapsed to a single value −3.8±0.6. This gauge factor is similar to that reported for conventional metallic strain gauges. In general, stretchable sensors produced as described herein can be expected to exhibit gauge factors in the range of from about 1 to about 10 or from about 3 to about 5. The gauge factor may remain substantially constant all the way up to very high strains (e.g., about 400% or higher). The stretchable sensors also exhibit high sensitivities (ΔR/Δε) at both low and high strains. Most sensors are either sensitive at low strains and not at high strains, or sensitive at high strains and not at low strains. The stretchable sensors described herein can monitor low strains of about 20% or less, about 10% or less, or about 5% or less, and as low as about 1%. The stretchable sensors may also or alternatively be able to monitor high strains of at least about 100%, at least about 200%, at least about 300%, at least about 400%, or at least about 500%, and up to about 800%. In some cases, the stretchable sensors may be able to monitor even higher strains up to a maximum of about 900%.

Besides cyclic straining, the sensors are also tested for their response to a Heaviside strain input ("step test"). The above-described sensors are extended to 100% strain at a crosshead speed of 23 mm/s, held at 100% strain for 20 seconds, and then relaxed back to zero strain at the same rate. Again, the sensors printed at higher translation speeds demonstrated increased sensitivity compared to sensors printed at slower speeds (FIGS. 10A-10B).

During step testing, the sensors exhibited overshooting in response to acceleration, followed by relaxation back to a steady state value—a behavior not observed for the oscillatory testing at lower crosshead speeds. This may be due to a couple of factors. First, the conductivity of sensors formed from conductive filaments comprising conductive carbon grease may be attributed to a percolated carbon black network. For rapid accelerations, this network may be temporarily disrupted, resulting in a non-geometrically driven resistance change. After a period of relaxation, the carbon black network may be able to reform and the nominal resistance change may be lowered to a level dictated by the elongated sensor geometry. Second, the carbon black particles and the viscous oil may behave as a continuum such that the viscoelastic nature of the filament prevents it from immediately following the dimensional change of the encapsulating material when the sensor is rapidly elongated. This may result in temporary discontinuities of the filament itself, producing higher resistances than geometric changes alone. After a period of relaxation, the filament may be able to regain continuity, and re-establish the steady state resistance consistent with the altered sensor geometry.

Figure 10A:
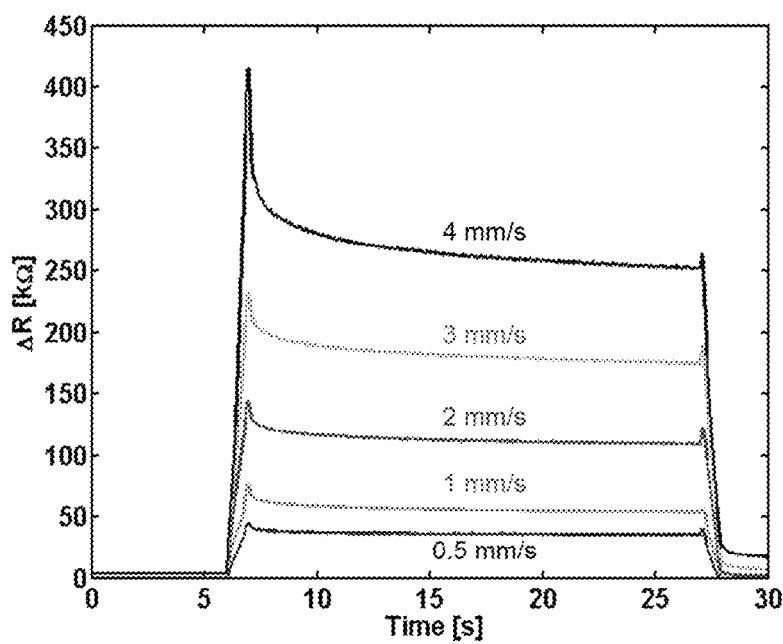
FIG. 10A shows representative performance for each sensor size under step deformation. All cycles went to 100% strain at a crosshead speed of 23 mm/s.

From FIG. 10A, it also appears that more sensitive sensors may have higher acceleration peaks. However, when peak height is normalized with respect to plateau level, the difference in relative peak height between the most sensitive sensor (4 mm/s) and the least sensitive sensor (0.5 mm/s), differs by less than 10%. It may be advantageous to use these exemplary stretchable sensors for slower strain rate applications.

In an example of the use of e-3DP to create a functional device for biomechanical sensing that is integrated with a human-machine interface, stretchable sensors are embedded in an EF glove (FIG. 11A). To fabricate the glove, uncured components of the support matrix are poured into a hand-shaped mold designed to produce a glove that could readily fit over a user's hand. A conductive filament comprising conductive carbon grease from MG Chemicals is directly printed into the region of the support matrix that defines the first knuckle area of each finger in the glove. After curing, the glove is removed from the mold and wired to a data collection system. Each strain gauge is 30 mm in length and 4 mm in width. The glove is then used to monitor the digit motion of a user in real time and to play a virtual piano. FIG.

11B shows the change in resistance for each finger and the thumb as of function of time and corresponding to five different hand positions.

Figure 14A:
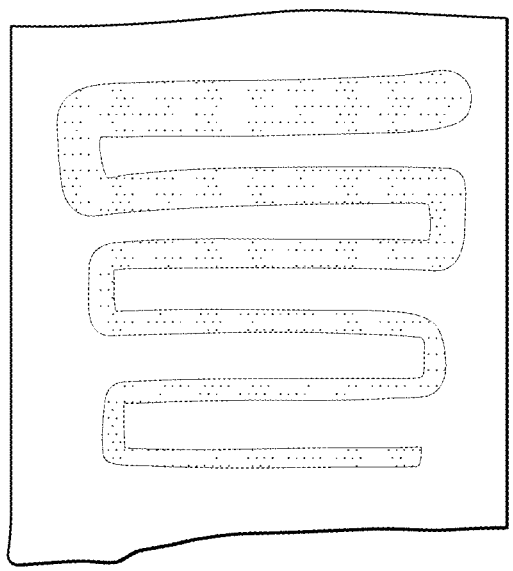
FIGS. 14A-14C show stages in the fabrication of a strain-sensitive conductive structure embedded in an elastomeric body including: (A) a cured matrix surrounding a sacrificial filament comprising a fugitive ink (Pluronic F127); (B) an evacuated channel after removal of the fugitive ink; and (C) the same channel infilled with a liquid metal.
Figure 14B:
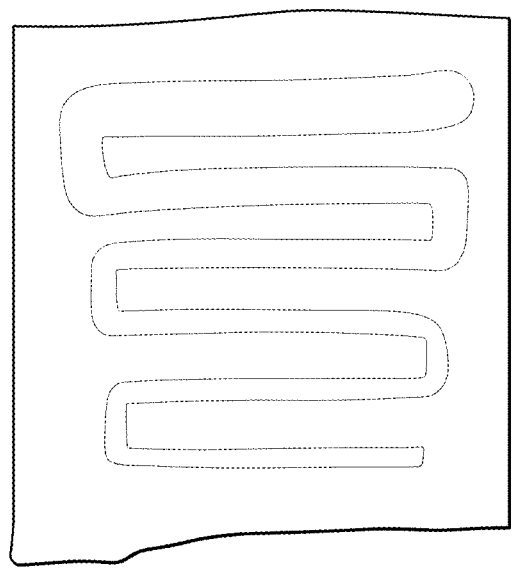
Figure 14C:
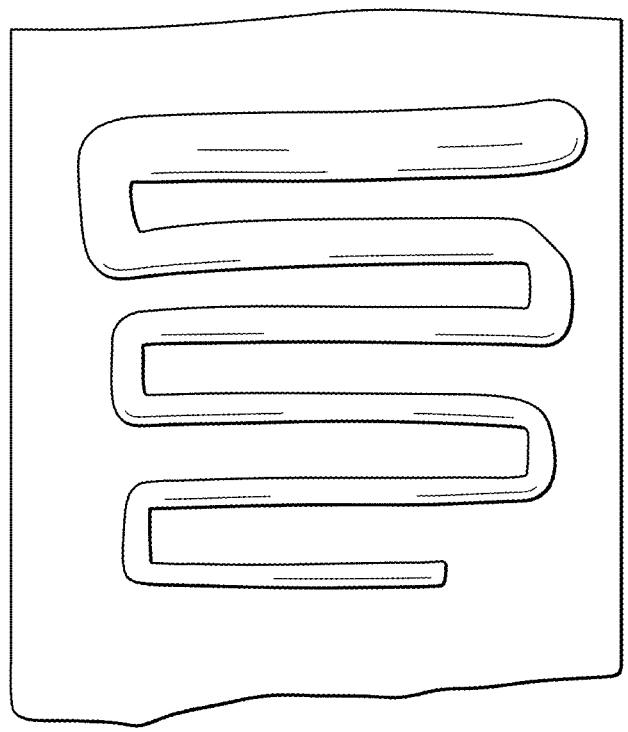
Figure 14C:
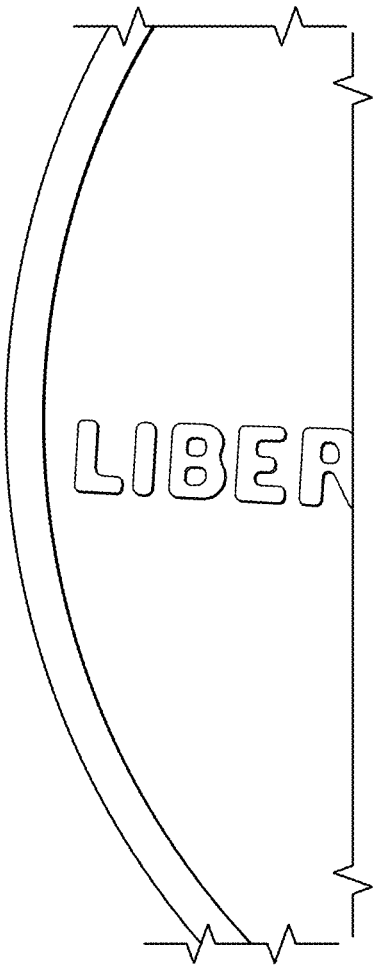

Shown in FIGS. 14A-14C is an embedded sensor formed by infilling a channel in an elastomeric body with a conductive fluid. Prior to infilling, the channel is created by depositing a sacrificial filament (comprising a fugitive ink) in a support matrix using e-3DP (FIG. 14A). The support matrix is cured and the fugitive ink is removed (FIG. 14B). In this example, the support matrix comprises a 1:1 mass ratio of SE 1700 (4:1) and Sylgard 184 (10:1), and is cured at a temperature of 80° C. to form a seamless elastomeric body. The fugitive ink comprises 30 wt. % Pluronic F127 and self-evacuates while the support matrix cures. The remaining channel is filled with a gallium-indium eutectic alloy to embed a strain-sensitive conductive structure in the seamless elastomeric body (FIG. 14C).

EXPERIMENTAL SECTION

Preparation of Ink: An exemplary ink was prepared by homogenizing as-received carbon conductive grease (CCG, MG Chemicals) by mixing it for two minutes at 2000 rpm in an ARE-310 planetary mixer (Thinky Mixer USA). After mixing, the ink was defoamed in the mixer for a further two minutes at 2200 rpm. The mixed and defoamed ink was loaded into a 3 cc syringe for printing.

Preparation of Reservoir: An exemplary support matrix (EFM) was synthesized by mixing 1 Part A Ecoflex® 00-30: 1 Part (Part B Ecoflex® 00-30+2 wt % Slo-Jo Platinum Silicone Cure Retarder) with 1 wt % Thivex. The filler (EFF) was produced by mixing 1 Part A: 1 Part (B+2 wt % Slo-Jo Platinum Silicone Cure Retarder) with 10 wt % Silicone Thinner. (All reagents were purchased from Smooth-On™). Thivex and Silicone Thinner were added to modify the rheology of their respective reservoir components, while Slo-Jo was added to prolong the pot-life of the reservoir to maximize printing time. Once the proper ratios of the ingredients were added together, the matrix and the reservoir were each mixed at 2000 rpm in the ARE-310 for one minute and thirty seconds. Defoaming was performed at 2200 rpm for the same time period. After mixing, the matrix was poured into a petri dish coated with mold release agent (Candle Mold Release, ArtMind™). The filler was layered on top of the matrix. Care was taken during pouring to avoid mixing air into the reservoir. After pouring, the entire petri dish was placed on a vortex mixer until the reservoir was leveled. The same procedure was used to create the glove, except the reservoir was poured into the hand mold instead of a petri dish.

Printing Procedure: All printed features were produced using a custom built 3D printer (ABG 10000, Aerotech Inc.) to move the ink-loaded syringe through the reservoir. All sensor print paths except for the out-of-plane helix were generated by writing the appropriate G-code commands. The print path for the out-of-plane helix shown in SI 5 was created using CAD software (AutoCAD 2013, Autodesk) and translated into G-code using CADFusion (Aerotech). The ink was extruded through a 410 µm inner diameter nozzle (Nordson EFD) via air pressure. Air pressure was controlled using an Ultimus V control apparatus (Nordson EFD).

Characterization of Rheology: The rheological properties of CCG, EFM, and EFF were analyzed at room temperature using a controlled stress rheometer (Discovery HR-3 Hybrid Rheometer, TA Instruments). A 40 mm tapered cone plate geometry (2.005°, 56 µm truncation gap) and a 40 mm disposable parallel plate geometry with 200 µm gap were used when studying the CCG and uncured Ecoflex®-based materials, respectively. Prior to rheological characterization, CCG from the vendor was mixed in a centrifugal mixer (Thinky Mixer ARE-250, Thinky Corp.) for 5 minutes at 2000 rpm. Rheological measurements were obtained on EFM and EFF within 20 minutes of their preparation. Oscillatory stress sweep studies were performed at a frequency of 1.0 Hz within the stress range of 0.1 to 2000 Pa. Viscometry studies were conducted over shear rates from 0.01 to 4000 s$^{-1}$.

Characterization of Sensor Performance: For all sensor characterization, the sensors were mounted on a mechanical tester (Instron 5544A, Instron) and stretched at various crosshead speeds (2.96 mm/s for cyclic testing, 23 mm/s for step testing, and 5 mm/s for ultimate strain testing). For the cyclic and step tests, all sensors were elongated to 100% strain. Ultimate strain specimens were extended to failure. The electrical connection was ensured by piercing the sensor's reservoirs with a pin soldered to wires. The wires were then connected to a voltage divider, and a voltage corresponding to the resistance change of the sensor was acquired by the load frame's voltage input.

Gauge factor was calculated by fitting a linear regression to the normalized resistance change vs. mechanical strain data for each soft sensor for one loading cycle up to 100% strain (crosshead speed=2.96 mm/s). The slope of the regression corresponded to the gauge factor of the sensor. The reported value was the average and standard deviation of 15 different sensors. Three sensors of each cross-sectional area were measured.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A 3D printed stretchable strain sensor comprising:
    a seamless monolithic elastomeric body; and
    a strain-sensitive conductive structure embedded in the seamless monolithic elastomeric body, the strain-sensitive conductive structure comprising one or more conductive filaments arranged in a continuous pattern, wherein the strain-sensitive conductive structure comprises a substantially circular transverse cross-section.

2. The printed stretchable strain sensor of claim 1, wherein the continuous pattern comprises a planar geometry.

3. The printed stretchable strain sensor of claim 1, wherein the continuous pattern comprises an out-of-plane geometry.

4. The printed stretchable strain sensor of claim 1, wherein the conductive filament is viscoelastic.

5. The printed stretchable strain sensor of claim 4, wherein the conductive filament comprises a shear-thinning material selected from the group consisting of: silicone oil, mineral oil, an organic solvent, an ionic liquid, a hydrogel, an organogel, and a liquid metal.

6. The printed stretchable strain sensor of claim 1, wherein the conductive filament comprises a plurality of conductive particles.

7. The printed stretchable strain sensor of claim 1, wherein the conductive filament comprises an intrinsically conductive polymer or an ionically conductive hydrogel.

8. The printed stretchable strain sensor of claim 1 comprising a gauge factor of from about 3 to about 5.

9. The printed stretchable strain sensor of of claim 1 comprising a sensitivity to strains of up to about 900%.

10. The printed stretchable strain sensor of claim 9, wherein the sensitivity is at least about 400%.

11. The printed stretchable strain sensor of claim 9, wherein the sensitivity includes strains as low as 1%.

12. The printed stretchable strain sensor of of claim 1 comprising a mechanical integrity sufficient to withstand cyclic loading from 0% to 100% strain at a strain rate of 10 mm/s or higher for at least 7000 cycles without failure.

13. An array of the printed stretchable strain sensors of claim 1 comprising a plurality of the strain-sensitive conductive structures embedded in the seamless elastomeric body.

14. The array of claim 13, wherein at least one of the plurality of strain-sensitive conductive structures comprises one or more different characteristics, wherein the one or more different characteristics are selected from the group consisting of: a different cross-sectional area, a different length, a different orientation, a different configuration, and a different sensitivity $\Delta R/\Delta \varepsilon$.

15. A 3D printed stretchable strain sensor comprising:
a seamless monolithic elastomeric body; and
a strain-sensitive conductive structure embedded in the seamless monolithic elastomeric body, the strain-sensitive conductive structure comprising one or more conductive filaments arranged in a continuous pattern, wherein the one or more conductive filaments are viscoelastic.

* * * * *